United States Patent
Ye

(10) Patent No.: US 10,235,197 B2
(45) Date of Patent: Mar. 19, 2019

(54) CLOUD SYSTEM DATA MANAGEMENT METHOD AND APPARATUS

(71) Applicant: Huawei Technologies Co., Ltd., Shenzhen (CN)

(72) Inventor: Sihai Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 15/131,758

(22) Filed: Apr. 18, 2016

(65) Prior Publication Data

US 2016/0232027 A1    Aug. 11, 2016

Related U.S. Application Data

(63) Continuation of application No. PCT/CN2014/089516, filed on Oct. 25, 2014.

(30) Foreign Application Priority Data

Oct. 25, 2013   (CN) .......................... 2013 1 0511740

(51) Int. Cl.
    *G06F 9/455* (2018.01)
(52) U.S. Cl.
    CPC .............. *G06F 9/45558* (2013.01); *G06F 2009/45562* (2013.01); *G06F 2009/45579* (2013.01)
(58) Field of Classification Search
    None
    See application file for complete search history.

(56) References Cited

U.S. PATENT DOCUMENTS

| 2008/0046610 A1 | 2/2008 | Tripathi et al. |
| 2010/0064112 A1 | 3/2010 | Ji |
| 2012/0151177 A1 | 6/2012 | Kalach et al. |

(Continued)

FOREIGN PATENT DOCUMENTS

| CN | 101056175 A | 10/2007 |
| CN | 101448023 A | 6/2009 |

(Continued)

OTHER PUBLICATIONS

Partial English Translation and Abstract of Chinese Patent Application No. CN103544047, Part 1, Apr. 15, 2016, 6 pages.

(Continued)

*Primary Examiner* — Tammy E Lee
(74) *Attorney, Agent, or Firm* — Conley Rose, P.C.

(57) ABSTRACT

A cloud system data management method for alleviate a data leakage problem occurring when a user accessed by another user when a virtual data volume of the user is mounted to a virtual machine of another user includes creating a first virtual machine for a user and allocating a virtual data volume to the first virtual machine, setting an identifier of the virtual data volume as an identifier corresponding to a home identifier of the first virtual machine, determining, according to the identifier of the virtual data volume and a home identifier of a second virtual machine, whether the virtual data volume and the second virtual machine belong to a same user when the virtual data volume needs to be mounted to the second virtual machine, forbidding the virtual data volume to be mounted to the second virtual machine when they do not belong to the same user.

16 Claims, 3 Drawing Sheets

(56) References Cited

U.S. PATENT DOCUMENTS

| | | | |
|---|---|---|---|
| 2012/0158786 A1 | 6/2012 | Li et al. | |
| 2012/0311566 A1* | 12/2012 | Takaoka | H04L 41/5035 718/1 |
| 2013/0091183 A1* | 4/2013 | Edwards | G06F 3/0605 707/803 |

FOREIGN PATENT DOCUMENTS

| | | |
|---|---|---|
| CN | 102567667 A | 7/2012 |
| CN | 103064927 A | 4/2013 |
| CN | 103544047 A | 1/2014 |

OTHER PUBLICATIONS

Partial English Translation and Abstract of Chinese Patent Application No. CN103544047, Part 2, Apr. 15, 2016, 3 pages.

Foreign Communication From a Counterpart Application, Chinese Application No. 201310511740.7, Chinese Office Action dated Jan. 26, 2016, 5 pages.

Foreign Communication From a Counterpart Application, PCT Application No. PCT/CN2014/089516, English Translation of International Search Report dated Jan. 28, 2015, 2 pages.

Foreign Communication From a Counterpart Application, PCT Application No. PCT/CN2014/089516, English Translation of Written Opinion dated Jan. 28, 2015, 7 pages.

Konstantinou, A., et al., "An Architecture for Virtual Solution Composition and Deployment in Infrastructure Clouds," XP002610018, VTDC, Internet Citation, Retrieved from the Internet: URL: http://delivery.acm.org/10.1145/1560000/1555339/p9-konstantinou.pdf?key1=1555339&key2=0580489821&coll=DL&dl=ACM&CFID=111005859&CFTOKEN=66777387 [retrieved on Nov. 15, 2010], Jun. 15, 2009, 9 pages.

Foreign Communication From a Counterpart Application, European Application No. 14855743.2, Extended European Search Report dated Aug. 4, 2016, 7 pages.

\* cited by examiner

CLOUD SYSTEM DATA MANAGEMENT METHOD AND APPARATUS

CROSS-REFERENCE TO RELATED APPLICATION

This application is a continuation of International Application No. PCT/CN2014/089516, filed on Oct. 25, 2014, which claims priority to Chinese Patent Application No. 201310511740.7, filed on Oct. 25, 2013, both of which are hereby incorporated by reference in their entireties.

TECHNICAL FIELD

The present disclosure relates to the computer field, and in particular, to a cloud system data management method and apparatus.

BACKGROUND

In a cloud data storage environment, for a user, ownership of and control rights for storage data are separated. An existing basic architecture of cloud computing includes a virtual machine and a virtual data volume, where the virtual machine controls the virtual data volume. The virtual data volume, also referred to as a logical unit or a logical volume, is a data volume obtained by logically partitioning storage space that belongs to a same user and that is in hardware storage space. An administrator may establish a correspondence between the virtual machine and the virtual data volume using a cloud operating system (Cloud OS), and each virtual machine corresponds to one user.

The administrator has operation and maintenance rights, and may mount a virtual data volume to another virtual machine using the cloud operating system. A logical unit number (LUN) is used as an example of the virtual data volume. An LUN1 originally belongs to a virtual machine VM1, and a virtual data volume LUN2 originally belongs to a virtual machine VM2. The administrator can mount the virtual data volume LUN1 to the virtual machine VM2 using the cloud operating system. As a result, a user of the virtual machine VM2 can view data of the virtual data volume LUN1. There is a data leakage risk, when the virtual machine VM1 and the virtual machine VM2 belong to different users.

SUMMARY

Embodiments of the present disclosure provide a cloud system data management method and apparatus in order to reduce a data leakage risk that is incurred when a virtual data volume is mounted to another virtual machine.

According to a first aspect, an embodiment of the present disclosure provides a cloud system data management method, where the method includes creating a first virtual machine for a user and allocating a virtual data volume to the first virtual machine, where the first virtual machine has a home identifier, and the home identifier of the first virtual machine is used to identify a user to which the first virtual machine belongs, setting an identifier of the virtual data volume as an identifier corresponding to the home identifier of the first virtual machine, determining whether a home identifier of the second virtual machine corresponds to the identifier of the virtual data volume when the virtual data volume needs to be mounted to a second virtual machine, and allowing the virtual data volume to be mounted to the second virtual machine when the home identifier of the second virtual machine corresponds to the identifier of the virtual data volume, forbidding the virtual data volume to be mounted to the second virtual machine when the home identifier of the second virtual machine does not correspond to the identifier of the virtual data volume.

Based on the first aspect, in a first possible implementation manner, determining whether a home identifier of the second virtual machine corresponds to the identifier of the virtual data volume further includes determining whether the home identifier of the second virtual machine and the identifier of the virtual data volume are identical.

Based on the first aspect or the first possible implementation manner of the first aspect, in a second possible implementation manner, the method further includes setting an identifier of dynamic data of the first virtual machine as an identifier corresponding to the home identifier of the first virtual machine, and when the dynamic data needs to be transferred to the second virtual machine, determining whether the home identifier of the second virtual machine corresponds to the identifier of the dynamic data, and allowing the dynamic data to be transferred to the second virtual machine when the home identifier of the second virtual machine corresponds to the identifier of the dynamic data, or forbidding the dynamic data to be transferred to the second virtual machine when the home identifier of the second virtual machine does not correspond to the identifier of the dynamic data.

Based on the second possible implementation manner of the first aspect, in a third possible implementation manner, dynamic data is data in memory of a virtual machine.

Based on the first aspect, in a fourth possible implementation manner, the method further includes setting the identifier of the virtual data volume as a public identifier to indicate that the virtual data volume may be mounted to any virtual machine before the virtual data volume is allocated to any virtual machine.

According to a second aspect, an embodiment of the present disclosure provides a cloud system data management apparatus, where the apparatus includes a creating unit configured to create a first virtual machine for a user and allocate a virtual data volume to the first virtual machine, where the first virtual machine has a home identifier, and the home identifier of the first virtual machine is used to identify a user to which the first virtual machine belongs, a setting unit configured to set an identifier of the virtual data volume as an identifier corresponding to the home identifier of the first virtual machine, a determining unit configured to determine whether a home identifier of the second virtual machine corresponds to the identifier of the virtual data volume when the virtual data volume needs to be mounted to a second virtual machine, and a processing unit configured to allow the virtual data volume to be mounted to the second virtual machine when the home identifier of the second virtual machine corresponds to the identifier of the virtual data volume, or forbid the virtual data volume to be mounted to the second virtual machine when the home identifier of the second virtual machine does not correspond to the identifier of the virtual data volume.

Based on the second aspect, in a first possible implementation manner, the determining unit is further configured to determine whether the home identifier of the second virtual machine and the identifier of the virtual data volume are identical.

Based on the second aspect or the first possible implementation manner of the second aspect, in a second possible implementation manner, the setting unit is further configured to set an identifier of dynamic data of the first virtual machine as an identifier corresponding to the home identifier of the first virtual machine. The determining unit is further configured to determine whether the home identifier of the second virtual machine corresponds to the identifier of the dynamic data when the dynamic data needs to be transferred to the second virtual machine, and the processing unit is further configured to allow the dynamic data to be transferred to the second virtual machine when the home identifier of the second virtual machine corresponds to the identifier of the dynamic data, or forbid the dynamic data to be transferred to the second virtual when the home identifier of the second virtual machine does not correspond to the identifier of the dynamic data.

Based on the second possible implementation manner of the second aspect, in a third possible implementation manner, the dynamic data is data in memory of the first virtual machine.

Based on the second aspect, in a fourth possible implementation manner, the setting unit is further configured to set the identifier of the virtual data volume as a public identifier to indicate that the virtual data volume may be mounted to any virtual machine before the virtual data volume is allocated to any virtual machine.

Based on the second aspect, in a fifth possible implementation manner, the apparatus further includes an acquiring unit configured to acquire a correspondence between the second virtual machine and the user and send the correspondence to the determining unit.

According to the cloud system data management method and apparatus provided in the embodiments of the present disclosure, when a virtual data volume is allocated to a first virtual machine, an identifier of the virtual data volume is set as an identifier corresponding to a home identifier of the first virtual machine, and when the virtual data volume needs to be mounted to a second virtual machine, it is determined whether a home identifier of the second virtual machine corresponds to the identifier of the virtual data volume such that a virtual data volume of a user is only allowed to be mounted to a virtual machine that belongs to the same user. This can alleviate a data leakage problem that arises in the following case. An administrator mounts a virtual data volume of a user to a virtual machine of another user, and consequently data of the user can be accessed by the other user.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following further describes the technical solutions of the present disclosure in detail with reference to the accompanying drawings and the embodiments.

Figure 1:
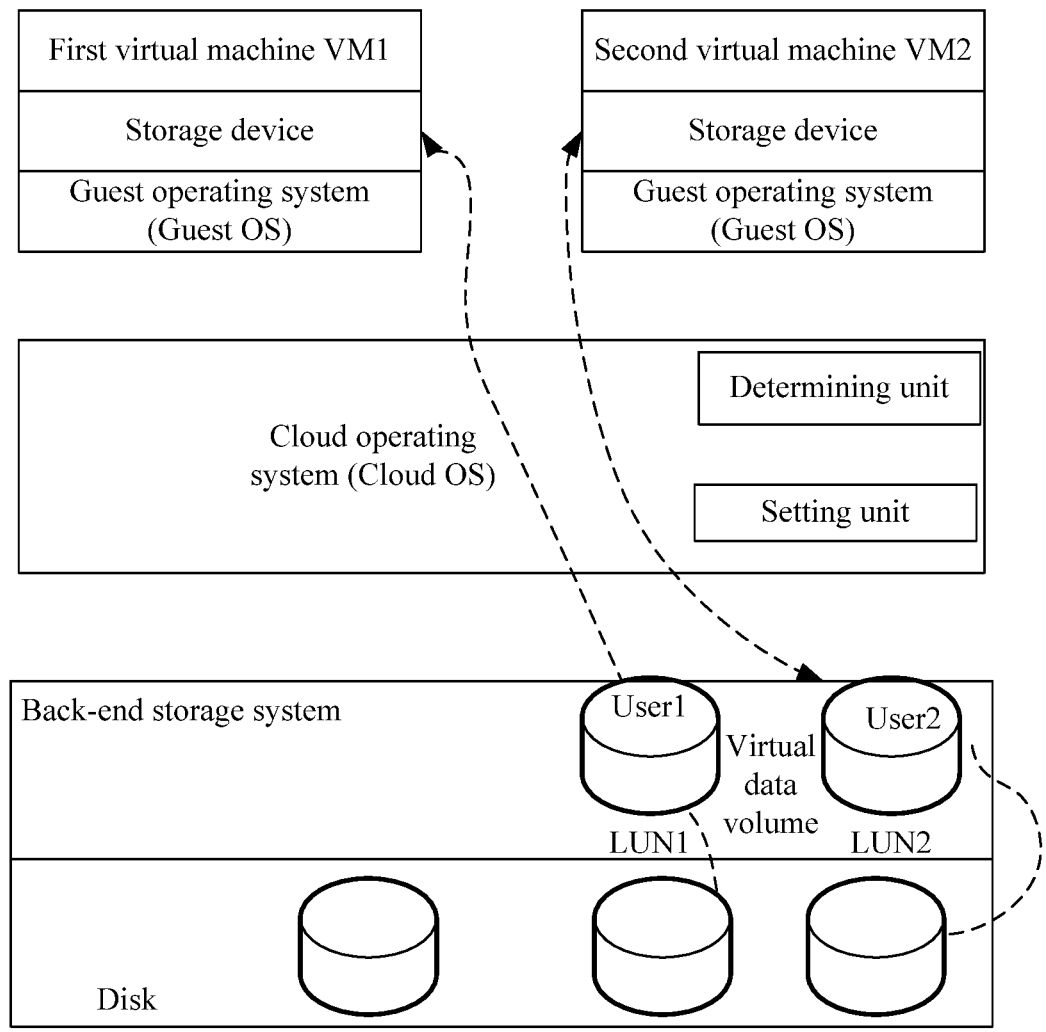
FIG. 1 is an architecture diagram of a cloud operating system in an embodiment of the present disclosure.

As shown in FIG. 1, FIG. 1 is an architecture diagram of an application system of a cloud system data management method according to an embodiment of the present disclosure. In a Cloud OS, a correspondence needs to be established between a virtual data volume and a virtual machine, such as a correspondence established between a virtual data volume LUN1 and a virtual machine VM1 when the LUN1 is allocated to the virtual machine VM1, or a correspondence established between an LUN2 and a virtual machine VM2 when the virtual data volume LUN2 is allocated to the virtual machine VM2. After a virtual machine is created for a user using the Cloud OS and a virtual data volume is allocated to the user, a setting unit sets an identifier for the virtual data volume to identify a user to which the virtual data volume belongs. When an administrator wants to unmount the virtual data volume and mount the virtual data volume to a target virtual machine, a determining unit determines, according to an identifier of the current virtual data volume, whether the virtual data volume and the target virtual machine belong to a same user. If the virtual data volume and the target virtual machine belong to the same user, the mounting is allowed. Otherwise, the mounting is forbidden. In this way, it is implemented that a virtual data volume of a virtual machine of a user can be mounted only to another virtual machine of the same user by the administrator, and is forbidden to be mounted to a virtual machine of another user. This can reduce a data leakage risk incurred by mounting the virtual data volume to the other virtual machine.

In a more specific example, the setting unit and the determining unit may be two newly-added modules of the Cloud OS.

Figure 2:
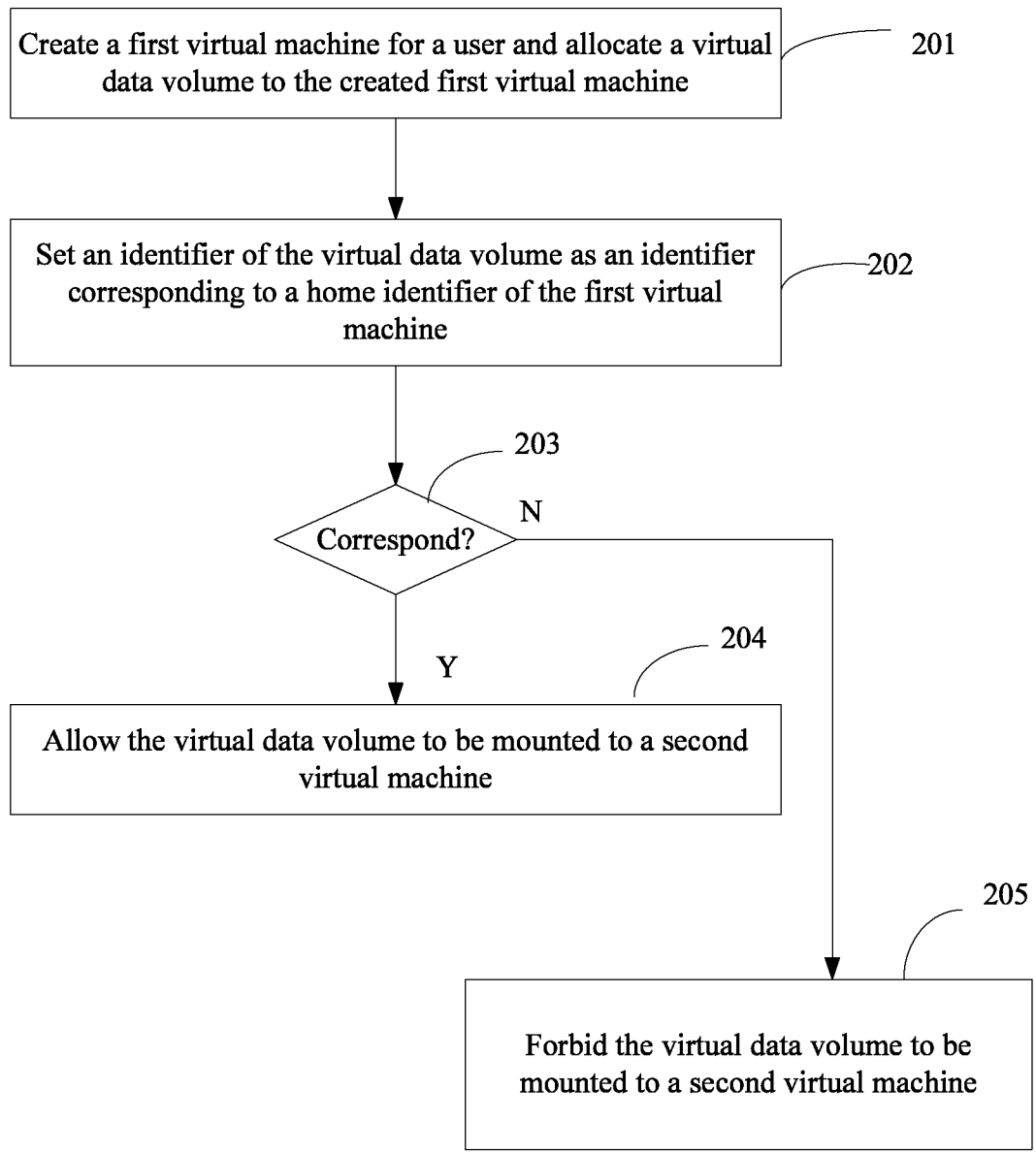
FIG. 2 is a flowchart of a cloud system data management method according to an embodiment of the present disclosure.

As shown in FIG. 2, based on the foregoing architecture, an embodiment of the present disclosure provides a cloud system data management method, where the method includes the following steps.

Step 201: Create a first virtual machine for a user and allocate a virtual data volume to the first virtual machine that is created, where the first virtual machine has a home identifier, and the home identifier of the first virtual machine is used to identify a user to which the first virtual machine belongs.

The home identifier of the first virtual machine may be further an identifier, such as a user name or a user identifier (ID), of the user to which the first virtual machine belongs.

The method for the administrator to create a virtual machine and a virtual data volume on a cloud server using the cloud operating system is a general technology, and therefore, details are not described herein.

After creating the virtual machine and the virtual data volume, the administrator may allocate the virtual machine and the virtual data volume to a specific user. It may be that only one virtual machine and one virtual data volume are allocated to a user, or multiple virtual machines and multiple virtual data volumes are allocated to a user. In other words, a user may have at least one virtual machine and at least one virtual data volume. Virtual machines allocated to a user have identical or corresponding virtual machine home identifiers.

Step 202: Set an identifier of the virtual data volume as an identifier corresponding to the home identifier of the first virtual machine.

Furthermore, after a virtual machine is created, an operating user may create a virtual data volume for the virtual machine using the Cloud OS. If the virtual machine has not been allocated to a specific user then, the system sets a public identifier, such as public (public is merely an example and may be another identifier), for the virtual data volume using the setting unit in order to indicate that the virtual data volume can be mounted to any virtual machine.

After the first virtual machine is allocated to a determined user, the setting unit changes the public identifier of the virtual data volume to an identifier corresponding to the home identifier of the first virtual machine. The identifier of the virtual data volume and the home identifier of the first virtual machine may be identical or may be partially identical, or a corresponding mapping relationship may be set up between the identifier of the virtual data volume and the home identifier of the first virtual machine. For ease of operation, the identifier of the virtual data volume is generally set to be identical to the home identifier of the virtual machine, for example, as shown in Table 1.

TABLE 1

| Virtual machine | Virtual data volume | | Virtual machine | Virtual data volume | User |
|---|---|---|---|---|---|
| VM1 | LUN1 | ⇒ | VM1 | LUN1 | User ID1 |
| VM2 | LUN2 | | VM2 | LUN2 | User ID2 |
| VM3 | LUN3 | | VM3 | LUN3 | User ID3 |
| VM3 | LUN4 | | VM3 | LUN4 | User ID3 |

Similarly, if one virtual machine has multiple virtual data volumes, the setting unit needs to set a corresponding identifier for each virtual data volume.

Step 203: Determine whether a home identifier of the second virtual machine corresponds to the identifier of the virtual data volume when the virtual data volume needs to be mounted to a second virtual machine.

When the operating user attempts to mount a current virtual data volume to the second virtual machine, the determining unit of the cloud operating system determines, according to an identifier of the virtual data volume and the home identifier of the second virtual machine, whether the current virtual data volume and the second virtual machine belong to a same user, where the determining unit may acquire, via an acquiring unit, a belonging relationship between the user and the virtual machine using an interface.

For example, whether virtual machine home identifiers of the two virtual machines correspond to each other may be determined by comparing the home identifiers of the two virtual machines.

Step 204: If the home identifier of the second virtual machine corresponds to the identifier of the virtual data volume, allow the virtual data volume to be mounted to the second virtual machine.

Step 205: If the home identifier of the second virtual machine does not correspond to the identifier of the virtual data volume, forbid the virtual data volume to be mounted to the second virtual machine.

According to the foregoing embodiment, when a virtual data volume is allocated to a first virtual machine, an identifier of the virtual data volume is set as an identifier corresponding to a home identifier of the first virtual machine, and when the virtual data volume needs to be mounted to a second virtual machine, it is determined whether a home identifier of the second virtual machine corresponds to the identifier of the virtual data volume such that a virtual data volume of a user is only allowed to be mounted to a virtual machine that belongs to the same user. This can alleviate a data leakage problem that arises in the following case. An administrator mounts a virtual data volume of a user to a virtual machine of another user, and consequently data of the user can be accessed by the other user.

In an embodiment, the identifier of the virtual data volume is used to identify a user to which the virtual data volume belongs, and a home identifier of a virtual machine and an identifier of a virtual data volume that belongs to a same user as the virtual machine are identical.

The determining unit determines whether the home identifier of the second virtual machine and the identifier of the virtual data volume are identical. The virtual data volume is allowed to be mounted to the second virtual machine when the home identifier of the second virtual machine and the identifier of the virtual data volume are identical. The virtual data volume is forbidden to be mounted to the second virtual machine when the home identifier of the second virtual machine and the identifier of the virtual data volume are not identical.

In a more specific embodiment, when the administrator allocates a virtual data volume LUN1 to a virtual machine VM1, the setting unit changes an identifier of the LUN1 to a home identifier User ID1 of the virtual machine VM1. When the administrator unmounts the virtual data volume LUN1 from the virtual machine VM1, the LUN1 no longer belongs to the virtual machine VM1, and the administrator mounts the virtual data volume LUN1 to a virtual machine VM2, the determining unit checks whether the identifier User ID1 of the virtual data volume LUN1 and a home identifier User ID2 of the virtual machine VM2 are identical. The operation of mounting is allowed, when the identifier User ID1 of the virtual data volume LUN1 and a home identifier User ID2 of the virtual machine VM2 are identical. Otherwise, the LUN1 is forbidden to be mounted to the VM2, and execution of the administrator fails.

If the identifier of the virtual data volume is public, which indicates that the virtual data volume has not been allocated to any specific user, the determining unit does not check a user identifier of the target virtual machine VM2 to which the virtual data volume is to be mounted, but directly allows the virtual data volume to be mounted to the second virtual machine VM2. If the identifier of the virtual data volume is not a public identifier, the determining unit needs to compare the identifier of the virtual data volume with the home identifier of the second virtual machine that acts as the target virtual machine, to make a determination.

In another implementation embodiment, it may be that no identifier is added to the virtual data volume. When the administrator needs to perform a volume mounting operation, the cloud operating system queries a user identifier of a virtual machine to which the virtual data volume LUN1 originally belongs and a user identifier of the target virtual machine VM2. If the two user identifiers are consistent, the volume mounting succeeds. Otherwise, the volume mounting fails.

There are other risks in the cloud operating system. For example, data of a virtual machine needs to be backed up to another virtual machine during virtual machine backup. If the two virtual machines belong to different users, it may also incur data leakage. Alternatively, if a virtual machine needs to be migrated from a physical server to a virtual machine on another physical server, static data in the virtual machine and dynamic data in memory need to be copied to the to-be-migrated virtual machine, and if the two virtual machines belong to different users, it may also incur a data leakage risk. Related preventive measures need to be taken for all data that may be transferred between two virtual machines in order to avoid data leakage due to a misoperation.

Therefore, in another possible implementation embodiment, after the first virtual machine is created, the first virtual machine is allocated to a determined user, an identifier of dynamic data of the first virtual machine is set as an identifier corresponding to the home identifier of the first virtual machine, and when the dynamic data needs to be transferred to the second virtual machine, it is determined whether the home identifier of the second virtual machine corresponds to the identifier of the dynamic data, and the dynamic data is allowed to be transferred to the second virtual machine when the home identifier of the second virtual machine corresponds to the identifier of the dynamic data, or the dynamic data is forbidden to be transferred to the second virtual machine when the home identifier of the second virtual machine does not correspond to the identifier of the dynamic data.

The dynamic data may be data in memory of the virtual machine.

For a specific method, reference may be made to the description of the embodiment in FIG. 2.

According to the cloud system data management method provided in this embodiment of the present disclosure, an identifier of dynamic data is set as an identifier corresponding to a home identifier of a first virtual machine, and when the dynamic data needs to be transferred to a second virtual machine, it is determined whether a home identifier of the second virtual machine corresponds to the identifier of the dynamic data such that dynamic data of a user is only allowed to be transferred to a virtual machine that belongs to the same user. This can alleviate a data leakage problem that arises in the following case. An administrator mounts dynamic data of a user to a virtual machine of another user, and consequently data of the user can be accessed by the other user.

Figure 3:
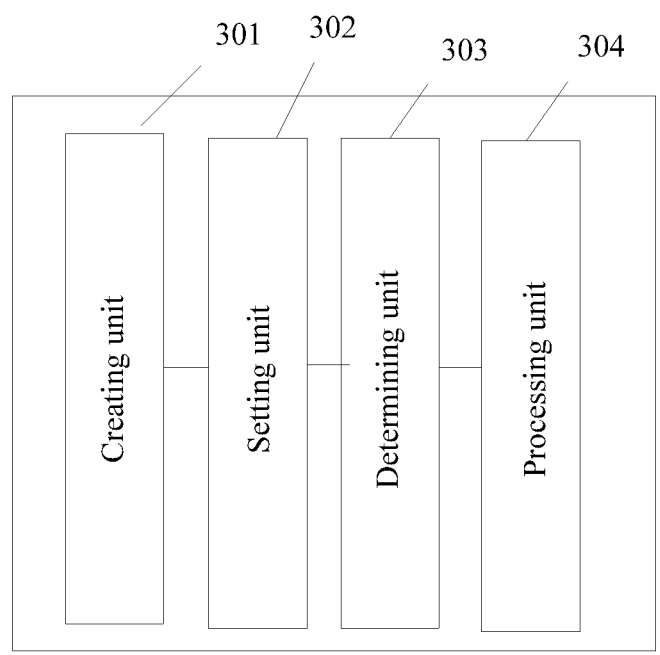
FIG. 3 is a structural diagram of a cloud system data management apparatus according to an embodiment of the present disclosure.

Correspondingly, an embodiment of the present disclosure provides a cloud system data management apparatus that is used to implement the method in the foregoing embodiments. As shown in FIG. 3, the apparatus includes a creating unit 301 configured to create a first virtual machine for a user and allocate a virtual data volume to the first virtual machine, where the first virtual machine has a home identifier, and the home identifier of the first virtual machine is used to identify a user to which the first virtual machine belongs, a setting unit 302 configured to set an identifier of the virtual data volume as an identifier corresponding to the home identifier of the first virtual machine, a determining unit 303 configured to determine whether a home identifier of the second virtual machine corresponds to the identifier of the virtual data volume when the virtual data volume needs to be mounted to a second virtual machine, and a processing unit 304 configured to allow the virtual data volume to be mounted to the second virtual machine when the home identifier of the second virtual machine corresponds to the identifier of the virtual data volume, or forbid the virtual data volume to be mounted to the second virtual machine when the home identifier of the second virtual machine does not correspond to the identifier of the virtual data volume.

In a first possible implementation manner, the identifier of the virtual data volume is used to identify a user to which the virtual data volume belongs, and a home identifier of a virtual machine and an identifier of a virtual data volume that belongs to a same user as the virtual machine are identical.

The determining unit 303 is further configured to determine whether the home identifier of the second virtual machine and the identifier of the virtual data volume are identical, and the processing unit 304 allows the virtual data volume to be mounted to the second virtual machine when the home identifier of the second virtual machine and the identifier of the virtual data volume are identical, or the processing unit 304 forbids the virtual data volume to be mounted to the second virtual machine when the home identifier of the second virtual machine and the identifier of the virtual data volume are not identical.

In another implementation manner, the setting unit 302 is further configured to set an identifier of dynamic data of the first virtual machine as an identifier corresponding to the home identifier of the first virtual machine.

The determining unit 303 is further configured to determine whether the home identifier of the second virtual machine corresponds to the identifier of the dynamic data when the dynamic data needs to be transferred to the second virtual machine.

The processing unit 304 is further configured to allow the dynamic data to be transferred to the second virtual machine when the home identifier of the second virtual machine corresponds to the identifier of the dynamic data, or forbid the dynamic data to be transferred to the second virtual when the home identifier of the second virtual machine does not correspond to the identifier of the dynamic data.

In this implementation manner, the dynamic data is data in memory of the first virtual machine.

In another implementation manner, the setting unit 302 is further configured to set the identifier of the virtual data volume as a public identifier to indicate that the virtual data volume may be mounted to any virtual machine before the virtual data volume is allocated to any virtual machine.

The determining unit 303 is further configured to determine whether the identifier of the virtual data volume is the public identifier when the virtual data volume needs to be mounted to the second virtual machine, and the processing unit 304 allows the virtual data volume to be mounted to the second virtual machine when the identifier of the virtual data volume is the public identifier, or the determining unit 303 determines whether the home identifier of the second virtual machine corresponds to the identifier of the virtual data volume when the identifier of the virtual data volume is not the public identifier.

In the foregoing implementation manners, an acquiring unit may further be disposed in the apparatus to acquire a correspondence between the second virtual machine and the user and send the correspondence to the determining unit 303.

According to the cloud system data management apparatus provided in this embodiment of the present disclosure an identifier of the virtual data volume is set as an identifier corresponding to a home identifier of the first virtual machine when a virtual data volume is allocated to a first virtual machine, and when the virtual data volume needs to be mounted to a second virtual machine, it is determined whether a home identifier of the second virtual machine corresponds to the identifier of the virtual data volume such that a virtual data volume of a user is only allowed to be mounted to a virtual machine that belongs to the same user. This can alleviate a data leakage problem that arises in the following case. An administrator mounts a virtual data volume of a user to a virtual machine of another user, and consequently data of the user can be accessed by the other user.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may be disposed in a random access memory (RAM), a memory, a read-only memory (ROM), an electrically programmable ROM, an electrically erasable programmable ROM, a register, a hard disk, a removable disk, a compact-disc read-only memory (CD-ROM), or a storage medium in any other forms well-known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A cloud system data management method, comprising:
    creating a first virtual machine for a user, the first virtual machine having a first home identifier that identifies the user, and the first virtual machine comprising dynamic data having a dynamic data identifier that corresponds to the first home identifier;
    allocating a virtual data volume to the first virtual machine, the virtual data volume having a virtual data volume identifier corresponding to the first home identifier;
    determining, according to the virtual data volume identifier and a second home identifier of a second virtual machine, whether the virtual data volume and the second virtual machine belong to the user when the virtual data volume needs to be moved to the second virtual machine;
    forbidding the virtual data volume to be moved to the second virtual machine when the virtual data volume and the second virtual machine do not belong to the user;
    determining whether the second home identifier corresponds to the dynamic data identifier when the dynamic data needs to be transferred to the second virtual machine;
    allowing the dynamic data to be transferred to the second virtual machine when the second home identifier corresponds to the dynamic data identifier; and
    forbidding the dynamic data to be transferred to the second virtual machine when the second home identifier does not correspond to the dynamic data identifier.

2. The method of claim 1, further comprising allowing the virtual data volume to be moved to the second virtual machine when the virtual data volume and the second virtual machine belong to the user.

3. The method of claim 2, wherein determining, according to the virtual data volume identifier and the second home identifier, whether the virtual data volume and the second virtual machine belong to the user comprises determining whether the second home identifier and the virtual data volume identifier are identical, the virtual data volume and the second virtual machine belong to the user when the second home identifier and the virtual data volume identifier are identical, and the virtual data volume and the second virtual machine do not belong to the user when the second home identifier and the virtual data volume identifier are not identical.

4. The method of claim 1, wherein the dynamic data is data in a memory of the first virtual machine.

5. The method of claim 1, further comprising setting the virtual data volume identifier as a public identifier to indicate that the virtual data volume may be moved to any virtual machine before the virtual data volume is allocated to the first virtual machine.

6. An apparatus, comprising:
    a processor; and
    a memory coupled to the processor, the memory having a plurality of instructions stored thereon that, when executed by the processor, cause the processor to:
        create a first virtual machine for a user, the first virtual machine having a first home identifier that identifies the user;
        allocate a virtual data volume to the first virtual machine, the virtual data volume having a virtual data volume identifier corresponding to the first home identifier;
        determine whether the virtual data volume identifier and a second home identifier of a second virtual machine are identical when the virtual data volume needs to be moved to the second virtual machine, the virtual data volume and the second virtual machine belonging to the user when the second home identifier and the virtual data volume identifier are identical, and the virtual data volume and the second virtual machine not belonging to the user when the second home identifier and the virtual data volume identifier are not identical;
        forbid the virtual data volume to be moved to the second virtual machine when the virtual data volume and the second virtual machine are not identical; and
        allow the virtual data volume to be moved to the second virtual machine when the virtual data volume and the second virtual machine are identical.

7. The apparatus of claim 6, wherein the instructions further cause the processor to:
    set a dynamic data identifier of dynamic data in the first virtual machine as corresponding to the first home identifier;
    determine whether the second home identifier corresponds to the dynamic data identifier when the dynamic data needs to be transferred to the second virtual machine;
    allow the dynamic data to be transferred to the second virtual machine when the second home identifier corresponds to the dynamic data identifier; and
    forbid the dynamic data to be transferred to the second virtual machine when the second home identifier does not correspond to the dynamic data identifier.

8. The apparatus of claim 7, wherein the dynamic data is data in a memory of the first virtual machine.

9. The apparatus of claim 6, wherein the instructions further cause the processor to set the virtual data volume identifier as a public identifier to indicate that the virtual data volume may be moved to any virtual machine before the virtual data volume is allocated to the first virtual machine.

10. The apparatus of claim 6, wherein the instructions further cause the processor to acquire a correspondence between the second virtual machine and the user.

11. A computer program product, comprising:
a non-transitory computer-readable medium configured to store computer executable instructions that, when executed by a processor, instruct the processor to:
create a first virtual machine for a user, the first virtual machine having a first home identifier that identifies the user;
set a virtual data volume identifier of a virtual data volume as a public identifier to indicate that the virtual data volume may be moved to any virtual machine, the virtual data volume identifier corresponding to the first home identifier;
allocate the virtual data volume to the first virtual machine;
determine, according to the virtual data volume identifier and a second home identifier of a second virtual machine, whether the virtual data volume and the second virtual machine belong to the user when the virtual data volume needs to be moved to the second virtual machine; and
forbid the virtual data volume to be moved to the second virtual machine when the virtual data volume and the second virtual machine do not belong to the user.

12. The computer program product of claim 11, wherein the computer executable instructions further cause the processor to allow the virtual data volume to be moved to the second virtual machine when the virtual data volume and the second virtual machine belong to the user.

13. The computer program product of claim 12, wherein the computer executable instructions further cause the processor to determine whether the second home identifier and the virtual data volume identifier are identical, the virtual data volume and the second virtual machine belong to the user when the second home identifier and the virtual data volume identifier are identical, and the virtual data volume and the second virtual machine do not belong to the user when the second home identifier and the virtual data volume identifier are not identical.

14. The computer program product of claim 11, wherein the computer executable instructions further cause the processor to:
set a dynamic data identifier of dynamic data in the first virtual machine as an identifier corresponding to the first home identifier;
determine whether the second home identifier corresponds to the dynamic data identifier when the dynamic data needs to be transferred to the second virtual machine;
allow the dynamic data to be transferred to the second virtual machine when the second home identifier corresponds to the dynamic data identifier; and
forbid the dynamic data to be transferred to the second virtual machine when the second home identifier does not correspond to the dynamic data identifier.

15. The computer program product of claim 14, wherein the dynamic data is data in a memory of the first virtual machine.

16. The computer program product of claim 11, wherein the computer executable instructions further cause the processor to acquire a correspondence between the second virtual machine and the user.

* * * * *